United States Patent
Arlt et al.

(10) Patent No.: US 9,033,660 B2
(45) Date of Patent: May 19, 2015

(54) METHOD FOR OPERATING A WIND TURBINE, ARRANGEMENT AND SYSTEM

(75) Inventors: Volker Arlt, Langwedel (DE); Guillaume Steinmetz, Saint-Denis (FR); Ulrich Harms, Hamburg (DE); Gerd Hose, Preetz (DE)

(73) Assignee: Nordex Energy GmbH, Rostock (DE)

( * ) Notice: Subject to any disclaimer, the term of this patent is extended or adjusted under 35 U.S.C. 154(b) by 693 days.

(21) Appl. No.: 13/350,916

(22) Filed: Jan. 16, 2012

(65) Prior Publication Data
US 2012/0195756 A1    Aug. 2, 2012

(30) Foreign Application Priority Data
Jan. 28, 2011  (EP) ..................................... 11152546

(51) Int. Cl.
F03D 7/02    (2006.01)
(52) U.S. Cl.
CPC ......... F03D 7/0204 (2013.01); *Y10T 29/49316* (2015.01); *F05B 2260/99* (2013.01); *Y02E 10/723* (2013.01)
(58) Field of Classification Search
CPC ... F03D 7/0204; F03D 7/042; F03D 11/0091; F03D 11/0083; Y02E 10/723
USPC ...................... 416/1, 9, 61, 148, 149, 153, 35
See application file for complete search history.

(56) References Cited

U.S. PATENT DOCUMENTS

| | | | |
|---|---|---|---|
| 2,484,291 A | 10/1949 | Hays | |
| 4,197,056 A | 4/1980 | Huetter | |
| 4,242,043 A | 12/1980 | Poulsen | |
| 4,449,889 A | 5/1984 | Belden | |
| 7,195,445 B2 | 3/2007 | Wobben | |
| 7,302,903 B1* | 12/2007 | Behrens | ......................... 114/264 |
| 7,417,332 B2 | 8/2008 | Malakhova et al. | |
| 7,551,130 B2 | 6/2009 | Altenschulte | |
| 7,973,427 B2 | 7/2011 | Korba et al. | |
| 2009/0202347 A1* | 8/2009 | Rugger | ........................... 416/31 |
| 2009/0261588 A1* | 10/2009 | Von Mutius et al. | ............ 290/44 |

(Continued)

FOREIGN PATENT DOCUMENTS

WO    WO 2009/144435 A1    12/2009
WO    WO 2010/098814 A1    9/2010

(Continued)

OTHER PUBLICATIONS

"CAP 764 CAA Policy and Guidelines on Wind Turbines", Civil Aviation Authoriy, Internet Citation, Jul. 1, 2006, pp. 1 to 66, XP007918986; http///www.caa.co.uk/docs/33/Cap764.pdf.

(Continued)

*Primary Examiner* — Dwayne J White
*Assistant Examiner* — Adam W Brown
(74) *Attorney, Agent, or Firm* — Walter Ottesen P.A.

(57)    ABSTRACT

A method is provided for operating a wind turbine having an elongated stand apparatus, a generator rotatably mounted on the stand apparatus, and a rotor coupled to the generator via a rotor hub and the wind turbine also having an elongated rotor blade. A position of a radar system is determined with respect to the wind turbine and at least one area is determined for the rotational axis of the rotor as a function of the determined position which is not intended to be permanently assumed for alignment of the rotational axis of the rotor about the longitudinal axis of the stand apparatus. The wind turbine is operated with the at least one determined area not being permanently assumed for the alignment of the rotational axis of the rotor about the longitudinal axis of the stand apparatus.

14 Claims, 3 Drawing Sheets

(56) References Cited

U.S. PATENT DOCUMENTS

| | | |
|---|---|---|
| 2010/0166547 A1 | 7/2010 | Presz, Jr. et al. |
| 2011/0129352 A1 | 6/2011 | Bettermann et al. |
| 2011/0260908 A1 | 10/2011 | New et al. |

FOREIGN PATENT DOCUMENTS

| | | |
|---|---|---|
| WO | WO 2010/099773 A1 | 9/2010 |
| WO | WO 2010/109174 A1 | 9/2010 |
| WO | WO 2010/122350 A1 | 10/2010 |

OTHER PUBLICATIONS

Butler, M.M. et al, "Feasibility of Mitigating the Effects of Windfarms on Primary Radar", Department of Trade and Industry, Internet Citation, Jan. 1, 2003, pp. 1 to 71, XP007918988; http//www.bwea.com/aviation/ams_report.html.

Translation of search report of the Chinese Patent Office dated Jan. 2, 2014 in corresponding Chinese patent application 201210020275.2.

* cited by examiner

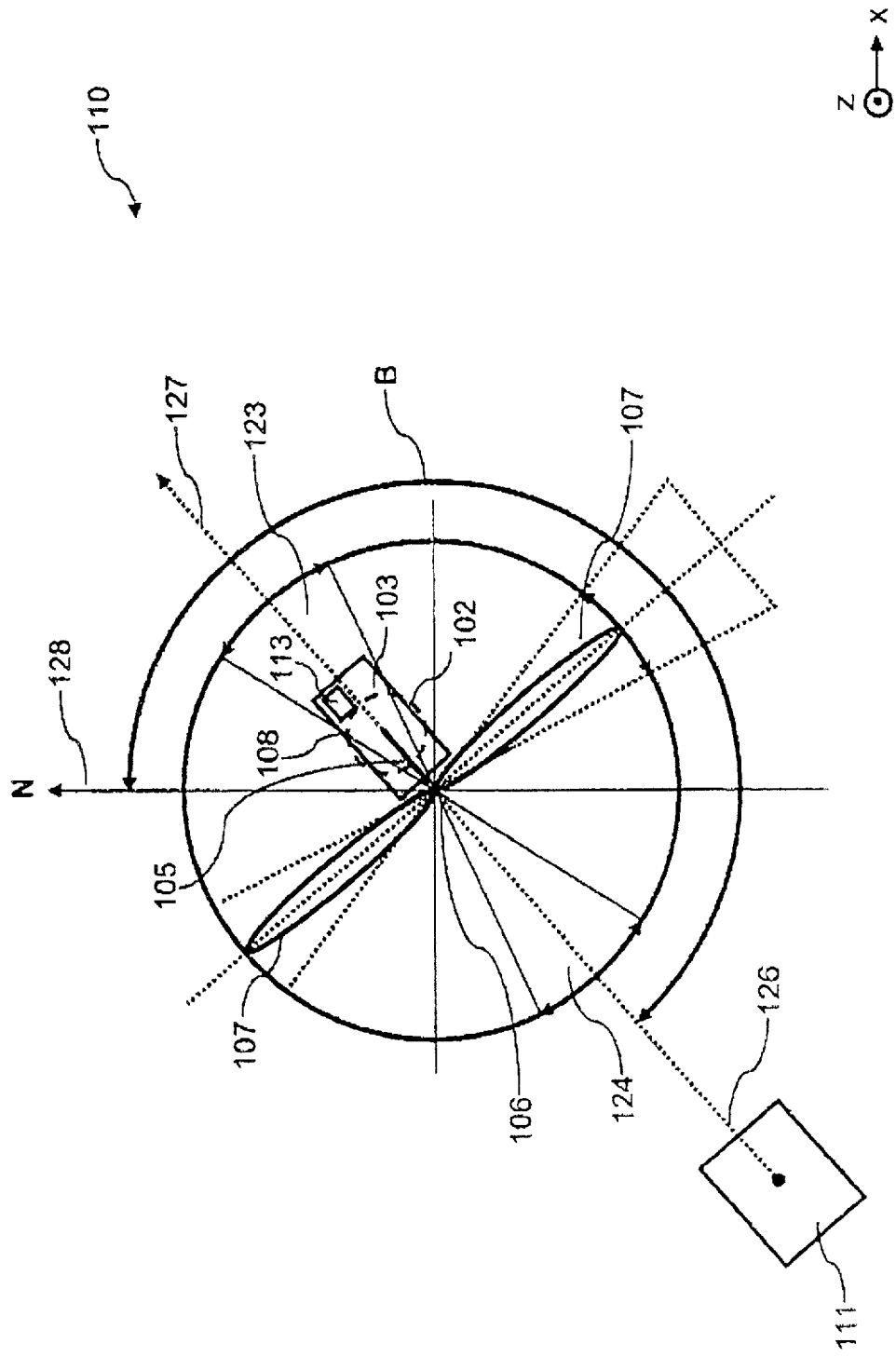

METHOD FOR OPERATING A WIND TURBINE, ARRANGEMENT AND SYSTEM

CROSS REFERENCE TO RELATED APPLICATION

This application claims priority of European patent application no. 11152546.5, filed Jan. 28, 2011, the entire content of which is incorporated herein by reference.

FIELD OF THE INVENTION

The invention relates to a method for operating a wind turbine and to an arrangement comprising such a wind turbine, which is designed to carry out the method. The invention also relates to a system comprising such an arrangement and a radar system, in particular a weather radar system or an air traffic control radar system.

BACKGROUND OF THE INVENTION

Weather radar systems are used to detect precipitation, intensity and the movement of precipitation systems, to determine the nature of the precipitation (for example rain, snow, hail) and to spatially and temporally predict the development of precipitation systems. Air traffic control radar systems are used to monitor air traffic.

Radar systems emit directional primary signals of pulsed electromagnetic radiation in the S band and/or the L band in the microwave range. The primary signals are produced by means of a pulsed magnetron or a klystron tube, which is connected to a parabola antenna via a waveguide, which is provided as both a transmitting and a receiving apparatus. The electromagnetic pulses propagate directionally from the radar station radially in a solid angle $\theta$, and are reflected on objects which are located within this solid angle, such as precipitation systems, raised terrain features, aircrafts, or other anthropogenic objects. Between the individual pulses, the radar station is used as a receiver for reflected secondary signals. The horizontal distance to a reflecting object can be determined from the propagation time of the reflected electromagnetic wave, which propagates at the speed of light in the pulse volume. Furthermore, the speed of reflecting objects can be derived from the phase shift of the back-scattered secondary signals of successive pulses ((pulsed) Doppler radar). The radial Doppler speed of the scattering object in this case results from the correlation of the intensities of successively detected secondary pulses. The tangential speed of the scattering object with respect to the radar station can be derived from the radial projection of the tangential speed from scattered signals detected in adjacent angle ranges.

Wind turbines can have a disadvantageous effect on the detection accuracy of radar systems. Because of the rotational movement of the rotor blades and the profile of the wind turbine changing as a function of the wind, wind turbines produce scattering signals, which can be misinterpreted by radar systems. If wind turbines are aligned on the basis of a wind direction which is at approximately 90° with respect to the incidence direction of a radar pulse, scattering on the moving rotor blades can cause doublets of speed signatures which are similar to natural weather conditions and can lead to misinterpretations and inaccurate short-term weather forecasts in critical weather situations. Disturbance signals such as these likewise have a disadvantageous effect on the identification of aircraft and the determination of their flight paths. Furthermore, weather systems which are located leeward with respect to the incidence direction are concealed by wind turbines, which leads to attenuation of the intensity of the secondary signals of such weather systems, making it harder to assess the precipitation intensity of such weather systems.

WO 2010/122350 A1 and WO 2010/109174 A1 describe the use of a rotor blade and a method for the production of a rotor blade for a wind turbine using an electromagnetically absorbent fabric with the aim of reducing the radar signature of wind turbines. The manufacturing process requires additional processing steps and materials, which leads to an increase in the manufacturing costs for rotor blade construction.

WO 2010/099773 A1 describes a method for detection of wind turbines using a radar system. In this case, wind turbines are merely identified and located as a fault source.

SUMMARY OF THE INVENTION

It is therefore desirable to provide a method for operating a wind turbine, allowing for an effective operation of the wind turbine while at the same time having only limited impact on the operation of a radar system. It is also desirable to provide an arrangement having such a wind turbine, which is configured to carry out the method. Furthermore, it is desirable to provide a system which comprises such an arrangement and a radar system, such that the arrangement has little influence on the radar system.

In one embodiment of the invention, a method for operation of a wind turbine includes providing a wind turbine. The wind turbine has an elongated stand apparatus, in particular a tower, for example in the form of a steel-tube, reinforced concrete, lattice or sandwich tower, as well as a generator which is rotatably mounted on top of the stand apparatus. The generator is coupled to a rotor via a rotor hub. The rotor has at least one elongated rotor blade. A position of a radar system is determined with respect to the wind turbine. An area for the rotational axis of the rotor in the direction of the generator is determined as a function of the determined position which is not intended to be permanently assumed for alignment of the rotor shaft about the longitudinal axis of the stand apparatus.

When the rotational axis of the rotor is rotated about the longitudinal axis of the stand apparatus, in particular in order to align the rotor as optimally as possible as a function of a measured wind direction, the area in which the movement of the rotor has a severe influence on the radar system is avoided. When the rotational axis of the rotor is rotated about the longitudinal axis of the stand apparatus, in particular in order to align the rotor as optimally as possible as a function of a measured wind direction, the area in which the movement of the rotor has a severe influence on the radar system is not intended to be permanently assumed. The area which is avoided corresponds to the area which is not intended to be permanently assumed. The area which is not intended to be permanently assumed may be passed through for alignment of the rotational axis of the rotor as a function of a wind direction. A time period for which the rotational axis of the rotor may be aligned in the area is predetermined. A position within the area is not assumed for longer than the predetermined time period. The time period is, for example, predetermined as a function of a speed at which the rotational axis of the rotor can be aligned. The rotational axis of the rotor corresponds in particular to the longitudinal axis of a rotor shaft.

In particular, the radar system is a weather radar system for detection of weather systems, or a radar system for air traffic control. In particular, at least two areas are avoided, in which the movement of the rotor initiates perceptions which are similar to weather phenomena in the radar system. The wind turbine can therefore be operated in the active area of one or more radar systems, with the radar system being operated reliably at the same time.

In some embodiments, the area which is not intended to be permanently assumed for the alignment of the rotational axis of the rotor is determined as a function of a straight line on which the radar system and the rotor hub lie. The straight line is an imaginary direct connecting line between the radar system and the rotor hub. The active area of the radar system is, in particular, an area around this straight line.

In some embodiments, an absolute geographic coordinate is predetermined, for example the North direction at the location of the wind turbine. The area which is not intended to be permanently assumed for the alignment is determined as a function of the absolute geographic coordinate. It is noted here that there is commonly no absolute angle of reference for the yaw system of a wind turbine. For this reason, the zero position of each wind turbine's yaw system might differ depending on the installation. Thus, the angle between each turbine's zero yaw position might differ and therefore the angle between the zero position and an absolute reference such as the geographical north can differ.

If a wind direction is determined for which the optimum alignment is located in the area to be avoided, in some embodiments, the rotational axis of the rotor is aligned with the edge of the area to be avoided. Conventionally, operation with an oblique incident flow, in which case the rotor shaft is not aligned as optimally as possible with the wind direction, should be avoided as far as possible since, during such operation with an oblique incident flow, the mechanical load on the wind turbine, in particular on the bearings and gear box, is higher than when aligned as optimally as possible with the wind direction.

If, in some embodiments, the rotational axis of the rotor is aligned with the edge of the area to be avoided, the wind turbine is operated with an oblique incident flow. In order to operate the wind turbine as effectively as possible, the rotational axis of the rotor is aligned with the edge of the area at which the oblique incident flow is minimal, in particular in comparison to the other edge of the area. This allows the wind turbine to be operated as effectively as possible while at the same time having little influence on the radar system. In particular, it is possible to pass through the areas to be avoided during alignment, however a long-lasting operation within the areas to be avoided should be avoided.

In some embodiments, a first value is specified for the rotational speed of the rotor via a control apparatus as a set-point value and a second value is determined for an actual rotational speed of the rotor, in particular immediately before passing through the area to be avoided.

The first value for the rotational speed is, in particular, dependent on the radar system, and is selected in such a manner that the rotation of the rotor at a rotational speed which is less than or equal to the first value does not adversely affect the radar system, or affects it only insignificantly. In particular, the first value corresponds to a no-load operation of the wind turbine, such that the rotor rotates only at a low rotational speed when passing through the area which is not intended to be permanently assumed. The rotational speed of the rotor is regulated to assume the predetermined first value, for example by using a rotor blade pitch system. The area to be avoided is passed through, subsequently. Once the longitudinal axis of the rotor shaft has passed through the area to be avoided, the rotational speed of the rotor can be regulated in accordance with the wind speed, and the rotational speed can be increased. This additionally avoids the radar system being influenced by passing through an area to be avoided.

In particular, the area in which the longitudinal axis of the rotor blade is in the direction of the connecting line between the radar system and the rotor hub is avoided, that is to say with the rotor shaft being aligned transversely, in particular at a right angle, with respect to the connecting line.

In further embodiments, the areas are avoided, in which the longitudinal direction of the rotor blade is aligned transversely with respect to the connecting line, that is, the rotor shaft is aligned in the direction of the connecting line. In particular, the areas in which the longitudinal direction of the rotor blade is aligned at a right angle to the connecting line are avoided. Thus, the areas in which the movement of the rotor has a severe influence on the radar system are avoided.

In further embodiments, information is provided for the radar system when the rotational axis of the rotor is in the area which is not intended to be permanently assumed for the alignment of the rotor shaft about the longitudinal axis of the stand apparatus. In some embodiments, the information is provided by a control apparatus of the wind turbine. In further embodiments, the information is provided by a central system. By way of example, the central system is a control system for a wind farm, which gathers and provides information relating to the respective wind turbines of the wind farm.

In further embodiments, the wind turbine is configured to determine whether the radar system is in operation. The areas which are not intended to be assumed are not actually permanently assumed only when the radar system is in operation. The information about the radar system is in some embodiments provided by the radar system to a control apparatus of the wind turbine. In further embodiments, the information is provided by the radar system to a central system. The central system is, for example, a control system for a wind farm, which provides the information to a plurality of wind turbines in a wind farm.

In one embodiment, an arrangement includes a wind turbine. Furthermore, the arrangement includes the control apparatus which is configured to carry out method steps for operation of the wind turbine according to the embodiments.

In one embodiment, a system includes such an arrangement. Furthermore, the system includes a radar system, with the wind turbine being arranged in an active area of the radar system. In particular, the radar system is a weather radar system or a radar system for air traffic control.

BRIEF DESCRIPTION OF THE DRAWINGS

The illustrated elements and their size relationships with respect to one another should in principle not be considered to be true to scale, and in fact individual elements, such as areas, may be illustrated with an exaggerated thickness or exaggerated large dimensions, in order to assist understanding.

The invention will now be described with reference to the drawings wherein.

DESCRIPTION OF THE PREFERRED
EMBODIMENTS OF THE INVENTION

Figure 1:
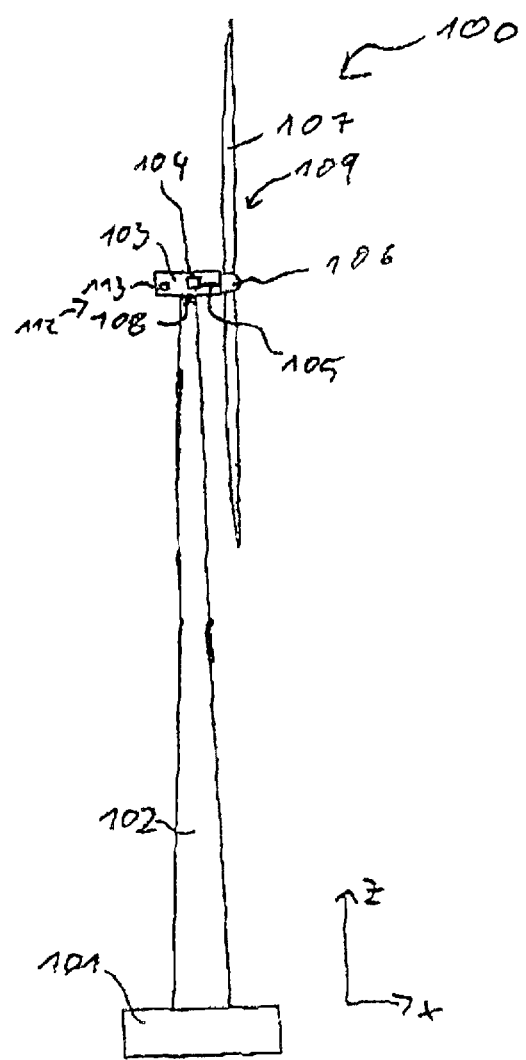
FIG. 1 shows a schematic of one embodiment of a wind turbine.

FIG. 1 shows a wind turbine 100. The wind turbine has a foundation 101, by means of which the wind turbine is mounted on a base. A stand apparatus 102 is coupled to the foundation. The stand apparatus 102 is elongated in the Z direction of FIG. 1. The stand apparatus 102 is, in particular, a tower, for example in the form of a steel-tube, reinforced concrete, lattice or sandwich tower.

A nacelle 103 is arranged at an end 108 of the stand apparatus 102 which end is opposite to the foundation 101. The nacelle includes a generator 104 which is coupled to a rotor 109 via a rotor shaft 105. In particular, the rotor shaft 105 is coupled to a rotor hub 106 of the rotor 109. The rotor 109 furthermore has a rotor blade 107 or a plurality of rotor blades 107, which is or are coupled to the rotor hub 106. During operation, the rotor 109 is caused to rotate by the wind, and this rotation is transmitted via the rotor shaft 105 to the generator 104, which converts the kinetic energy of the rotor 109 into electrical energy.

The nacelle 103 is coupled to the stand apparatus 102 such that the nacelle can rotate with the rotor about the longitudinal axis of the stand apparatus 102. The nacelle 103 is rotatably mounted on the stand apparatus 102 via a yaw bearing, such that the nacelle 103 and therefore also the rotor shaft 105, and in particular the longitudinal axis of the rotor shaft 105, can be adjusted in its horizontal alignment with respect to the wind direction. It is thus possible to align the nacelle 103 and in particular the rotor 109 as a function of a measured wind direction 127 so as to achieve high efficiency in the conversion of the kinetic energy of the wind into electrical energy by means of the generator 104. In particular, the nacelle 103 is aligned such that the rotor shaft 105 is aligned in the direction of the measured wind direction.

A control apparatus 113 is provided for alignment of the rotor, and is configured to align the rotor as a function of the measured wind direction 127. In some embodiments, the control apparatus 113 is part of an arrangement 112 which includes the control apparatus 113 and the wind turbine 100.

By way of example, during normal operating conditions of the wind turbine, the wind direction 127 is measured and averaged over a time interval of 10 minutes, and used to determine how the rotor hub 106 should be aligned with the wind direction. The time interval is in further embodiments longer than 10 minutes, and in yet further embodiments it is shorter than 10 minutes. During normal operation, the wind turbine is aligned to avoid an oblique incident flow, or to minimize it as much as possible.

For this purpose, the wind turbine comprises an apparatus for determination of the wind direction, for example a sensor device for wind direction determination by means of a wind vane or a 2D ultrasound anemometer for determining the horizontal components of the wind speed and the wind direction. The apparatus for determination of the wind direction detects at least measured values of the wind direction 127, and transmits these to the control apparatus 113.

For readjustment, the control apparatus 113 passes on a control signal to the yaw drive apparatus (not shown). The signal may, for example, be passed on directly to a frequency converter, via which a yaw drive is fed.

Figure 2:
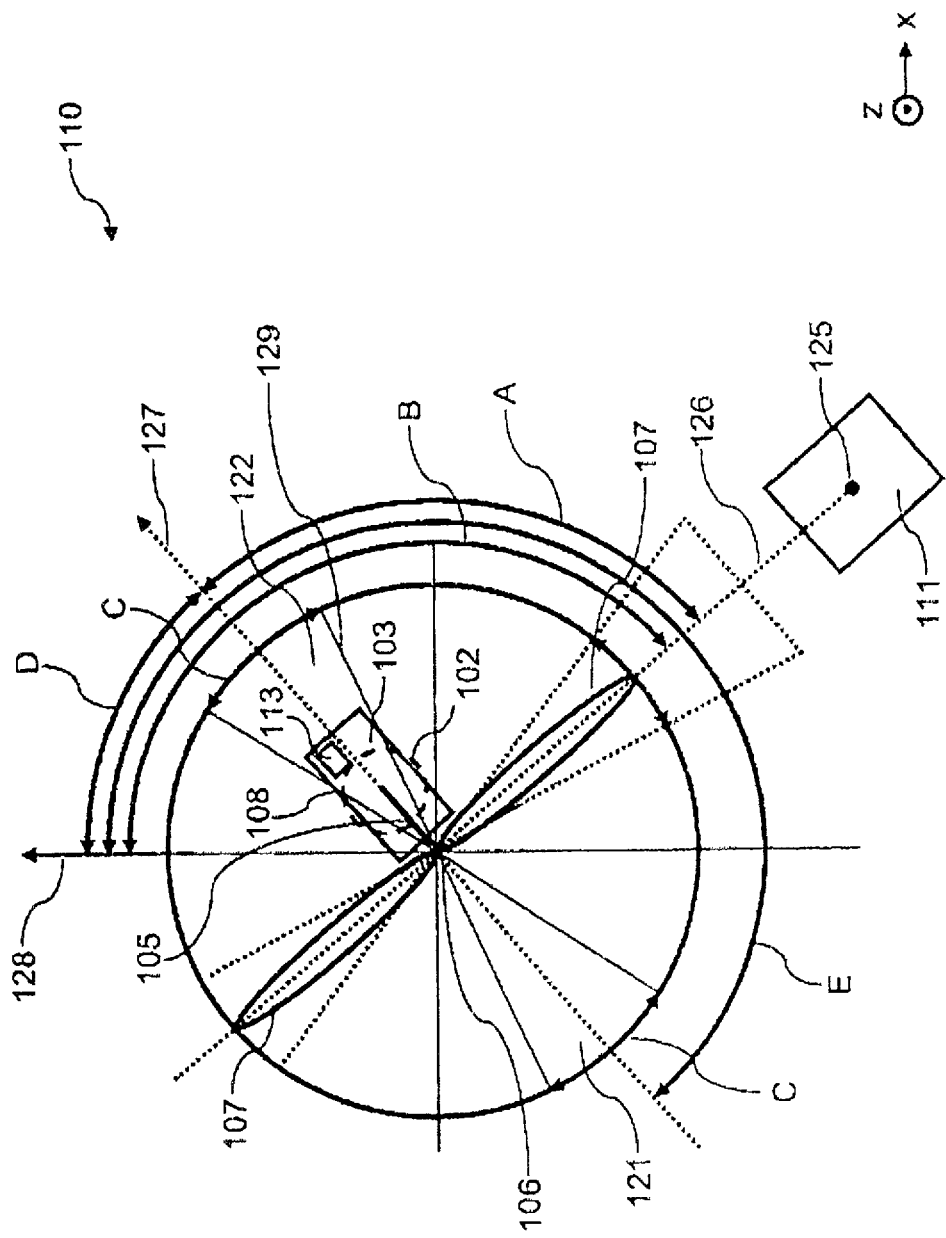
FIG. 2 shows a plan view of the wind turbine of FIG. 1 and a radar system according to one embodiment; and, FIG. 3 shows a plan view of the wind turbine of FIG. 1 and a radar system according to another embodiment.

FIG. 2 shows a system 110 comprising a wind turbine 100 and a radar system 111 according to one embodiment. The illustration shows a plan view of the wind turbine 100.

In particular, the radar system 111 is a weather radar system which is designed to detect precipitation, the intensity and the movement of weather systems, or is an air traffic control radar system for monitoring air traffic.

The wind turbine 100 is arranged in an active area of the radar system 111 in the system 110. The electromagnetic waves which are emitted from a transmitting and receiving antenna of the radar system reach the wind turbine 100. The movement of the rotor 109 and in particular of the rotor blades 107 is detected by the radar system 111. The rotational movement of the rotor blades, for example, has a pattern which is identified by the radar system as a weather phenomenon, for example precipitation.

A position 125 of the radar system with respect to the wind turbine system 110 is determined for operation of the wind turbine 100. In particular, a straight line 126, on which the radar system 111 and the rotor hub 106 lie, is determined. The active area of the radar system 111 is in the area of the straight line 126. In particular, the active area of the radar system surrounds the straight line 126.

In order to operate the wind turbine 100 in such a way that the operation of the radar system 111 is influenced as little as possible, more specifically, the movement of the rotor 109 causes as few disturbance signals as possible in the radar system 111, areas 121, 122 and 123, 124 (FIG. 3) are determined relative to one another, as a function of the position of the wind turbine 100 and of the radar system 111, in which areas an alignment of the rotational axis of the rotor, in particular an alignment of the rotor shaft 105, is not intended to be permanently assumed for alignment of the rotor as a function of the determined wind direction 127. The areas (121, 122) and (123, 124) are determined in particular as a function of the straight line 126.

In further embodiments, fewer than 4 areas, for example 2 areas, which are avoided for the alignment of the rotor shaft 105 as a function of the determined wind direction 127, are determined. In further embodiments, more than 4 areas, for example 6 areas, which are avoided for the alignment of the rotor shaft 105 as a function of the determined wind direction 127, are determined. This is the case in particular when the wind turbine is arranged in the active area of two or more radar systems. Furthermore, in some embodiments, further areas are determined by measurement, within which operation of the wind turbine has been found to have a disturbing effect on the radar system.

By way of example, the area 122 is determined as a function of an angle A between the rotor shaft and the straight line 126. The angle A for the area 122 is 90°. The size of the area around the longitudinal direction of the rotor shaft is predetermined by a further angle C. The angle C is the opening angle of the areas which are not intended to be permanently assumed when aligning the rotor shaft 105 about the longitudinal axis of the stand apparatus 102. The opening angle of the areas is in some embodiments of the same size in each case. In further embodiments, the opening angle of the areas is different in each case. The angle C indicates the width of the area 122. In particular, the angle C is dependent on the radar system 111 and the design configuration of the wind turbine 100, in particular on the design configuration of the rotor blades 107. The angle C is predetermined such that the area 122 is sufficiently large to avoid a major disturbance with the radar system over a relatively long time period. In a comparable manner to this, the areas 121 and 123 as well as 124 are determined, for which the angle A has a value of 180° (area 121), 270° (area 123) and 0° (area 124), respectively.

In further embodiments, an absolute geographic coordinate 128 is predetermined, for example the North direction. The absolute geographic coordinate 128 is determined, for example, when installing the wind turbine, and is stored in the control apparatus 113.

In the embodiments, the areas 121, 122, 123 and 124 are determined as a function of the absolute geographic coordinate 128. In this case, an angle B is determined between the absolute geographic coordinate 128 and the straight line 126. The area 122 is obtained from the angle B−90°, such that an angle D is formed between the longitudinal direction of the rotor shaft 105 and the direction of the absolute geographic coordinate 128. The area 121 is obtained in a corresponding manner from the angle B+90°, such that an angle E is formed between the absolute geographic coordinate 128 and the center of the area 121. The center of the area 124 forms the angle B with the absolute geographic coordinate 128. The center of the area 123 is obtained from the angle B+180°.

The areas 121 and 122 are thus determined in such a manner, that the rotor hub 105 is not aligned in such a manner that the longitudinal direction of the rotor blades 107 is directed in the direction of the straight line 126 over a longer time period. The longer time period here refers to the time period which is not significantly longer than required for aligning the yaw position of the wind turbine. The areas are determined such that the straight line 126 is not aligned in the rotation plane of the rotor blades over a longer time period. The areas 121 and 122 predetermine an alignment to be avoided for the rotor shaft 105, in which the longitudinal direction of the rotor blades 107 is oriented in the direction of the straight line 126.

FIG. 3 shows a rotated plan view of the system 110 shown in FIG. 2. The areas 123 and 124 each predetermine an area for the alignment of the rotor shaft 105 in which the longitudinal direction of the rotor blades 107 is transverse with respect to the straight line 126. Alignment of the rotor shaft 105 in the areas 123 and 124 is avoided, thus avoiding an alignment of the rotor 109 in which the longitudinal direction of the rotor blades 107 is transverse with respect to the straight line 126. This avoids a permanent alignment of the rotor shaft for which the stand apparatus 102 of the wind turbine is shadowed periodically by the movement of the rotor blades 107 with respect to the radar signals from the radar system 111 which impinge on the wind turbine 100, thus severely varying the scattered secondary signal over time, which would have a severe influence on the radar system 111.

If an optimum alignment of the wind turbine is determined as a function of the wind direction 127, in which the rotor shaft 105 is aligned in one of the areas 121, 122, 123 or 124, the control apparatus 113 aligns the rotor shaft 105 with an edge of the corresponding area, for example with an edge 129 of the area 122. The wind turbine can therefore be operated as close as possible to the optimum alignment, and therefore still operates effectively. At the same time, the wind turbine has little influence on the radar system 111.

In some embodiments, the wind turbine, in particular the control apparatus 113, is configured to provide information for the radar system 111 when one of the areas 121, 122, 123 or 124 to be avoided is passed through during alignment of the rotor shaft 105. When the rotation plane of the rotor 109 is aligned transversely with respect to the wind direction 127, it is possible for the rotor shaft 105 to be temporarily located in one of the areas 121, 122, 123 or 124 to be avoided. In dependence on the available information, the radar system can take account of the disturbance caused by the wind turbine during this time. For example, in the time in which the rotor shaft 105 is located in one of the areas to be avoided, the radar system 111 does not evaluate the radar signals.

For example, if the opening angle C of the area 122 equals 16°, that is, from −8 to +8°, and the wind turbine is operated such that it is aligned in the direction of +9° with respect to the center of the area 122, and if it is determined over a time interval of 10 minutes that the wind direction has settled on average at −9° with respect to the center of the area 122, it is permissible to readjust the rotor hub 105 through the area 122 to be avoided. For example, if it is found that the wind direction has settled on average at −2° with respect to the center of the area 122, the alignment of the turbine is readjusted to −8°, that is, to the closest edge 129 of the area 122. This minimizes an oblique incident flow, taking account of an area to be avoided.

Avoidance of the alignment of the rotor shaft 105 at least in the areas 121, 122, 123 and 124 allows the wind turbine 100 to be operated in a manner which has as little influence as possible on the radar system 111. Because the alignments of the rotor in which the movement of the rotor blades cause a severe disturbance in the operation of the radar system 111 are avoided, a reliable operation of the radar system 111 and a simultaneous effective operation of the wind turbine 100 are enabled.

It is understood that the foregoing description is that of the preferred embodiments of the invention and that various changes and modifications may be made thereto without departing from the spirit and scope of the invention as defined in the appended claims.

What is claimed is:

1. A method for operating a wind turbine, comprising the steps of:
   providing the wind turbine including an elongated stand apparatus, a generator rotatably mounted on the stand apparatus, and a rotor which is coupled to the generator via a rotor hub and has an elongated rotor blade;
   determining a position of a radar system with respect to the wind turbine;
   determining at least one area for aligning the rotational axis of the rotor in the direction of the generator as a function of the determined position of said radar system which is not intended to be permanently assumed for alignment of the rotational axis about the longitudinal axis of the elongated stand apparatus;
   operating the wind turbine with the at least one determined area not being permanently assumed when the rotational axis of the rotor is aligned about the longitudinal axis of the elongated stand apparatus;
   determining a wind direction of the wind flowing over the wind turbine;
   determining a value for the alignment of the rotational axis of the rotor as a function of the determined wind direction; and,
   aligning the rotational axis of the rotor with an edge of the area which is not intended to be permanently assumed for alignment of the rotational axis of the rotor about the longitudinal axis of the stand apparatus, when the determined value is in the area not intended to be permanently assumed for an alignment of the rotational axis of the rotor about the longitudinal axis of the stand apparatus.

2. The method of claim 1, further comprising determining the area, which is not intended to be permanently assumed for the alignment, as a function of an angle (A) between the rotational axis of the rotor and a straight line on which the radar system and the rotor hub lie.

3. The method of claim 2, further comprising the step of determining a further area, which is not intended to be permanently assumed for the alignment of the rotational axis of the rotor about the longitudinal axis of the stand apparatus, with the area and the further area each being determined such that the longitudinal direction of the rotor blade is aligned in the direction of the straight line on which the radar system and the rotor hub lie.

4. The method of claim 3, wherein two further areas are determined, which are avoided for alignment of the rotational axis of the rotor about the longitudinal axis of the stand apparatus, with the two areas being determined such that the longitudinal direction of the rotor blade is aligned transversely with respect to the straight line on which the radar system and the rotor hub lie.

5. The method of claim 1, further comprising:
predetermining an absolute geographic coordinate; and,
determining the area, which is not intended to be permanently assumed for the alignment, as a function of an angle (B) between the absolute geographic coordinate and a straight line on which the radar system and the rotor hub lie.

6. The method of claim 5, further comprising:
determining an angle (F) between the absolute geographic coordinate and the rotational axis of the rotor as a function of the angle (B) between the absolute geographic coordinate and the straight line on which the radar system and the rotor hub lie; and,
determining the area which is not intended to be permanently assumed for the alignment as a function of the angle (F) between the absolute geographic coordinate and the rotational axis of the rotor.

7. The method of claim 1, wherein said area is an area whereat an oblique incident flow is a minimum; and, the rotational axis of the rotor is aligned with the edge of the area at which the oblique incident flow is minimal.

8. The method of claim 1, further comprising the step of providing information for the radar system when the rotational axis of the rotor is in the area which is not intended to be permanently assumed for the alignment of the rotational axis of the rotor about the longitudinal axis of the stand apparatus.

9. The method of claim 1, further comprising the steps of:
specifying a first value of the rotational speed of the rotor via a control apparatus as a set-point value;
determining a second value for the rotational speed of the rotor via the control apparatus as an actual value;
comparing the second value of the rotational speed of the rotor and the first value for the rotational speed of the rotor; and,
changing the rotational speed of the rotor if the second value of the rotational speed of the rotor is greater than or equal to the first value of the rotational speed of the rotor.

10. The method of claim 9, further comprising the step of changing of the rotational speed of the rotor to a value which is less than or equal to the first value of the rotational speed.

11. The method of claim 9, wherein the first value of the rotational speed corresponds to a rotational speed of the rotor during no-load operation.

12. The method of claim 11, further comprising the step of regulating the rotational speed of the rotor in dependence upon an operating variable including a measured wind speed and/or the rotational speed of the rotor, when the rotational axis of the rotor is aligned outside the at least one area which is not intended to be permanently assumed for alignment of the rotational axis about the longitudinal axis of the stand apparatus, after the changing of the rotational speed of the rotor.

13. An arrangement comprising:
a wind turbine having an elongate stand apparatus; a rotor hub; a generator rotatably mounted on the stand apparatus; and, a rotor which is coupled to said generator via said rotor hub; and,
a control apparatus for the wind turbine, which is configured for: determining a position of a radar system with respect to the wind turbine; determining at least one area for the alignment of the rotational axis of the rotor in the direction of the generator as a function of the determined position which is not intended to be permanently assumed for alignment of the rotational axis of the rotor about the longitudinal axis of the stand apparatus; controlling the wind turbine in such a manner that the at least one determined area is not permanently assumed for the alignment of the rotational axis of the rotor about the longitudinal axis of the stand apparatus; determining a wind direction of the wind flowing over the wind turbine; determining a value for the alignment of the rotational axis of the rotor as a function of the determined wind direction; and, aligning the rotational axis of the rotor with an edge of the area which is not intended to be permanently assumed for alignment of the rotational axis of the rotor about the longitudinal axis of the stand apparatus, when the determined value is in the area not intended to be permanently assumed for an alignment of the rotational axis of the rotor about the longitudinal axis of the stand apparatus.

14. A system comprising:
an arrangement including a wind turbine having an elongate stand apparatus; a rotor hub; a generator rotatably mounted on the stand apparatus; and, a rotor which is coupled to said generator via said rotor hub;
a radar system;
said wind turbine being arranged in an active area of the radar system;
a control apparatus for the wind turbine, which is configured for: determining a position of said radar system with respect to the wind turbine; determining at least one area for the alignment of the rotational axis of the rotor in the direction of the generator as a function of the determined position which is not intended to be permanently assumed for alignment of the rotational axis of the rotor about the longitudinal axis of the stand apparatus; controlling the wind turbine in such a manner that the at least one determined area is not permanently assumed for the alignment of the rotational axis of the rotor about the longitudinal axis of the stand apparatus; determining a wind direction of the wind flowing over the wind turbine; determining a value for the alignment of the rotational axis of the rotor as a function of the determined wind direction; and, aligning the rotational axis of the rotor with an edge of the area which is not intended to be permanently assumed for alignment of the rotational axis of the rotor about the longitudinal axis of the stand apparatus, when the determined value is in the area not intended to be permanently assumed for an alignment of the rotational axis of the rotor about the longitudinal axis of the stand apparatus.

* * * * *